3,031,321
CELLULOSE ORGANIC ESTER COMPOSITIONS STABILIZED WITH 6,13 - DICHLORO - 3,10 - DIPHENYL-TRIPHENODIOXAZINE
Raymond C. Harris and Gordon C. Newland, Kingsport, Tenn., assignors to Eastman Kodak Company, Rochester, N.Y., a corporation of New Jersey
No Drawing. Filed July 24, 1959, Ser. No. 829,193
2 Claims. (Cl. 106—176)

This invention relates to stabilized cellulose organic acid ester plastics. More particularly, it relates to cellulose organic acid ester plastics stabilized against weathering to the extent required by outdoor use.

Most organic plastics undergo deterioration of one sort or another when exposed to sunlight. Cellulose organic esters, such, for example, as cellulose acetate, cellulose propionate, cellulose butyrate, cellulose acetate-propionate and cellulose acetate-butyrate, are no exception. The ideal

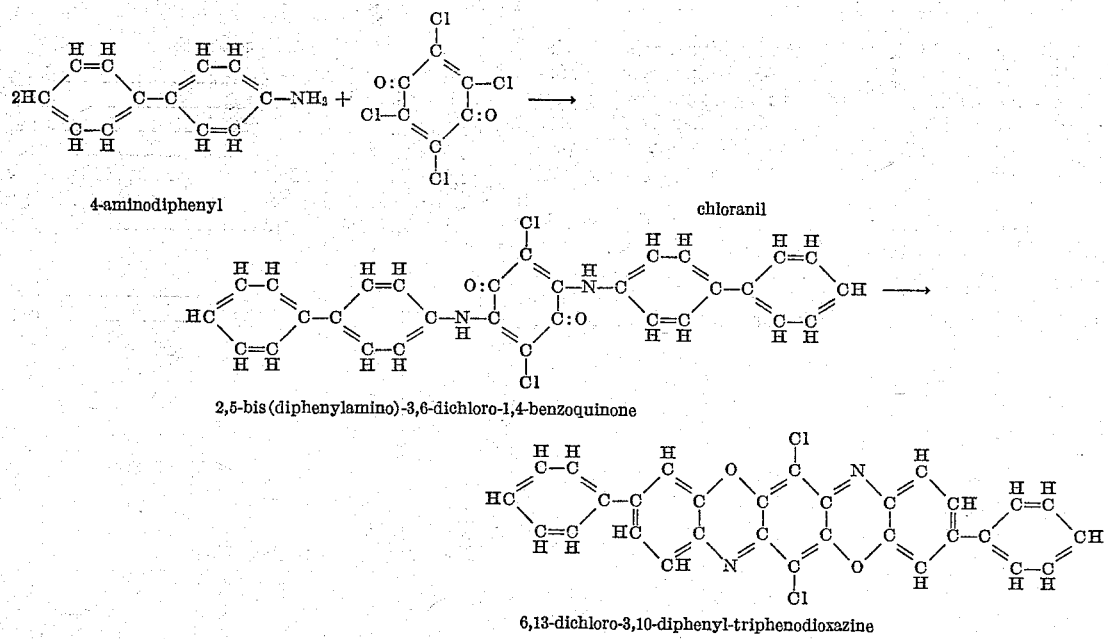

stabilizer for preventing this deterioration would be a colorless additive which on exposure in the plastic would be non-discoloring and non-fugitive, while doing its job of protecting the plastic from the damaging effects of ultraviolet light. Such an ideal stabilizer could then be incorporated in any plastic formulation without affecting the color. Unfortunately, no stabilizer is known which fulfills these requirements. Stabilizers such as phenyl salicylate, 3-ethyl-2-phenyliminobenzothiazoline, resorcinol monobenzoate, and certain derivatives of 2-hydroxybenzophenone, represent the closest known approaches to the ideal stabilizer.

For greater stabilizing efficiency, it has been necessary to use colored stabilizers such as certain azo dyes or inorganic pigments. Carbon black is, in fact the best weathering stabilizer known. Its use, however, is automatically limited to black compositions. For many outdoor uses it is desirable to have a composition which, though necessarily colored, is not black.

We have discovered that a reddish-brown organic pigment, 6,13-dichloro-3,10-diphenyl-triphenodioxazine, approaches carbon black in its efficiency as a weathering stabilizer for cellulose organic ester plastics. This compound may be prepared as follows, all parts being by weight unless otherwise specified.

A mixture of 67.6 parts of 4-aminodiphenyl, 49.2 parts of chloranil and 54 parts of anhydrous sodium acetate in 600 parts of absolute ethanol is heated to reflux, and refluxed with stirring for two hours. The reaction mixture is filtered, and the precipitate washed with ethanol and then with water, and dried at 60° C. A yield of 95 parts of 2,5-bis(diphenylamino) - 3,6-dichloro-1,4-benzoquinone is obtained.

A mixture of 75 parts of 2,5-bis(diphenylamino)-3,6-dichloro-1,4 - benzoquinone, 10.5 parts of phosphorus pentachloride, and 5 parts of benzoyl chloride in 300 parts of nitrobenzene is heated at 190–200° C., with constant stirring, for 8 hours, then allowed to cool slowly to room temperature. The reaction mixture is filtered, and the precipitate is washed with nitrobenzene and then with ethanol and dried at 60° C. The product is 6,13-dichloro-3,10-diphenyl-triphenodioxazine.

In testing our novel stabilizer, and comparing it with other stabilizers, one part by weight of the additive to be tested was incorporated, by hot roll compounding, in 100 parts by weight of cellulose acetate butyrate (13% acetyl, 38% butyryl) along with 12 parts by weight of the plasticizer dibutyl sebacate. The temperature of the front roll was 270° F., and that of the rear roll was 230° F. The roll-compounding was carried on for 4 minutes. The rolled composition was compression-molded at 320° F. for 10 minutes, into sheets of 0.050 inch thickness. From these sheets test samples 2.5 x 0.5 in. were cut.

The test samples were exposed both to artificial and to natural outdoor weathering; the former in a modified Atlas Twin-Arc Weather-Ometer (Anal. Chem., 25, 460 (1953)), the latter at Kingsport, Tennessee. The progress of weathering was followed by quantitative measurements of flexural strength, brittleness and inherent viscosity. Flexural strength and brittleness were measured by the Tour-Marchall procedure (A.S.T.M. D747–43). Brittleness was defined to have developed in the exposed samples when they broke at a bend angle of less than 90°. Inherent viscosities were measured on acetone solutions containing 0.23 g. cellulose ester per 100 cc. acetone, at 25° C. The inherent viscosity was defined as $$\frac{ln\eta_r}{0.23}$$

where $\eta_r$ is the ratio of viscosity of solution to viscosity of solvent. Usually the test strips became brittle when either flexural strength or inherent viscosity fell off to about 75% of their original values before exposure.

Data obtained in the Weather-Ometer tests are shown in the following table.

| Stabilizer | Weather-Ometer Exposure (Hr.) Required for— | | |
|---|---|---|---|
| | 25% Loss of Flexural Strength | Development of Brittleness | 25% Loss of Inherent Viscosity |
| None | 200 | 200 | 200 |
| Phenyl salicylate | 1,000 | 1,000 | 1,000 |
| Resorcinol monobenzoate | 1,800 | 2,000 | 1,600 |
| 6,13-Dichloro-3,10-diphenyl-tripheno-dioxazine | >22,000 | >22,000 | >22,000 |
| Carbon black | >30,000 | >30,000 | >30,000 |

The remarkable degree of stabilization achieved with the organic pigment 6,13-dichloro-3,10-diphenyl-triphenodioxazine is evident. There was no measurable weathering damage in this plastic composition after 22,000 hours of exposure in the modified Weather-Ometer. This performance has been equaled, to our knowledge, only by compositions containing carbon black.

In outdoor exposures, the unstabilized plastic failed in 1 year, that containing 1 part phenyl salicylate in 5 years, and that containing 1 part of resorcinol monobenzoate in 7 years. At the end of 7 years, neither the plastic containing 1 part of carbon black nor the plastic containing 1 part of 6,13-dichloro-3,10-diphenyl-triphenodioxazine had failed.

While we have shown the stabilizer in the amount of 1 part to 100 parts of cellulose ester, it will be understood that smaller and larger amounts of the stabilizer may be used, within the range of from 0.1 part to 10 parts by weight of stabilizer per 100 parts of cellulose organic acid ester.

Many plasticizers for cellulose organic acid esters are shown in the art, and it will be understood that plasticizers other than dibutyl sebacate may be used, and that the choice and proportion of plasticizer forms no part of our invention.

We claim:

1. A cellulose organic acid ester plastic composition stabilized against deterioration by weathering by a content of from 0.1 part to 10 parts by weight of 6,13-dichloro-3,10-diphenyl-triphenodioxazine per 100 parts by weight of cellulose ester.

2. A cellulose acetate-butyrate plastic composition stabilized against deterioration by weathering by a content of from 0.1 part to 10 parts by weight of 6,13-dichloro-3,10-diphenyl-triphenodioxazine per 100 parts by weight of cellulose acetate-butyrate.

References Cited in the file of this patent

UNITED STATES PATENTS

| | | |
|---|---|---|
| 2,011,428 | Voorhees | Aug. 13, 1935 |
| 2,077,863 | Thiess | Apr. 20, 1937 |
| 2,288,522 | Grevne et al. | June 30, 1942 |
| 2,386,855 | Horback | Oct. 16, 1945 |
| 2,693,467 | Anderau et al. | Nov. 2, 1954 |
| 2,761,789 | Locher et al. | Sept. 4, 1956 |
| 2,948,721 | Frey | Aug. 9, 1960 |

FOREIGN PATENTS

| | | |
|---|---|---|
| 840,132 | Germany | May 29, 1952 |
| 646,099 | Great Britain | Nov. 15, 1950 |